July 14, 1925.
T. M. HAMER
CUTTING APPARATUS
Filed March 20, 1925    3 Sheets-Sheet 1
1,546,128
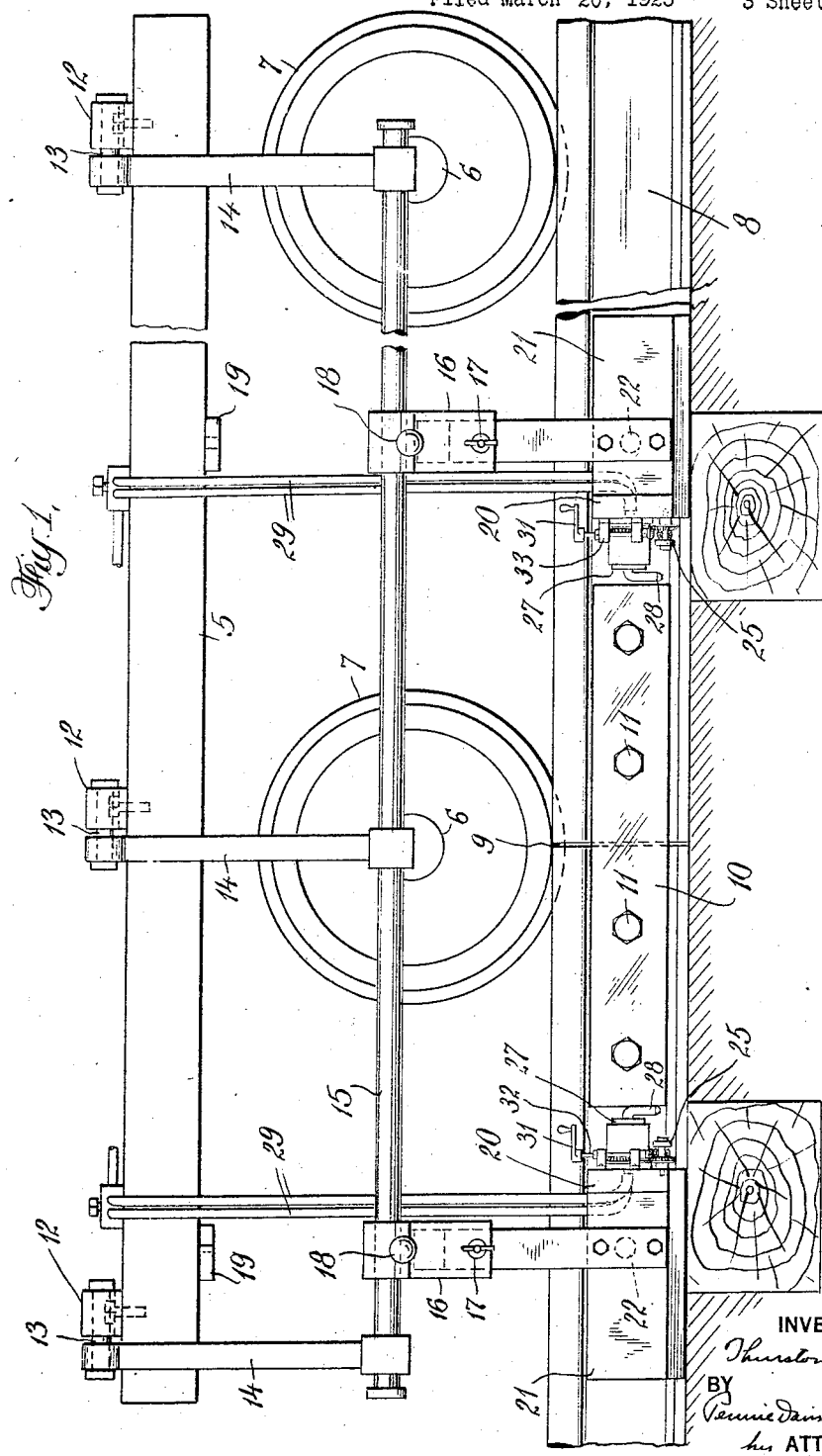

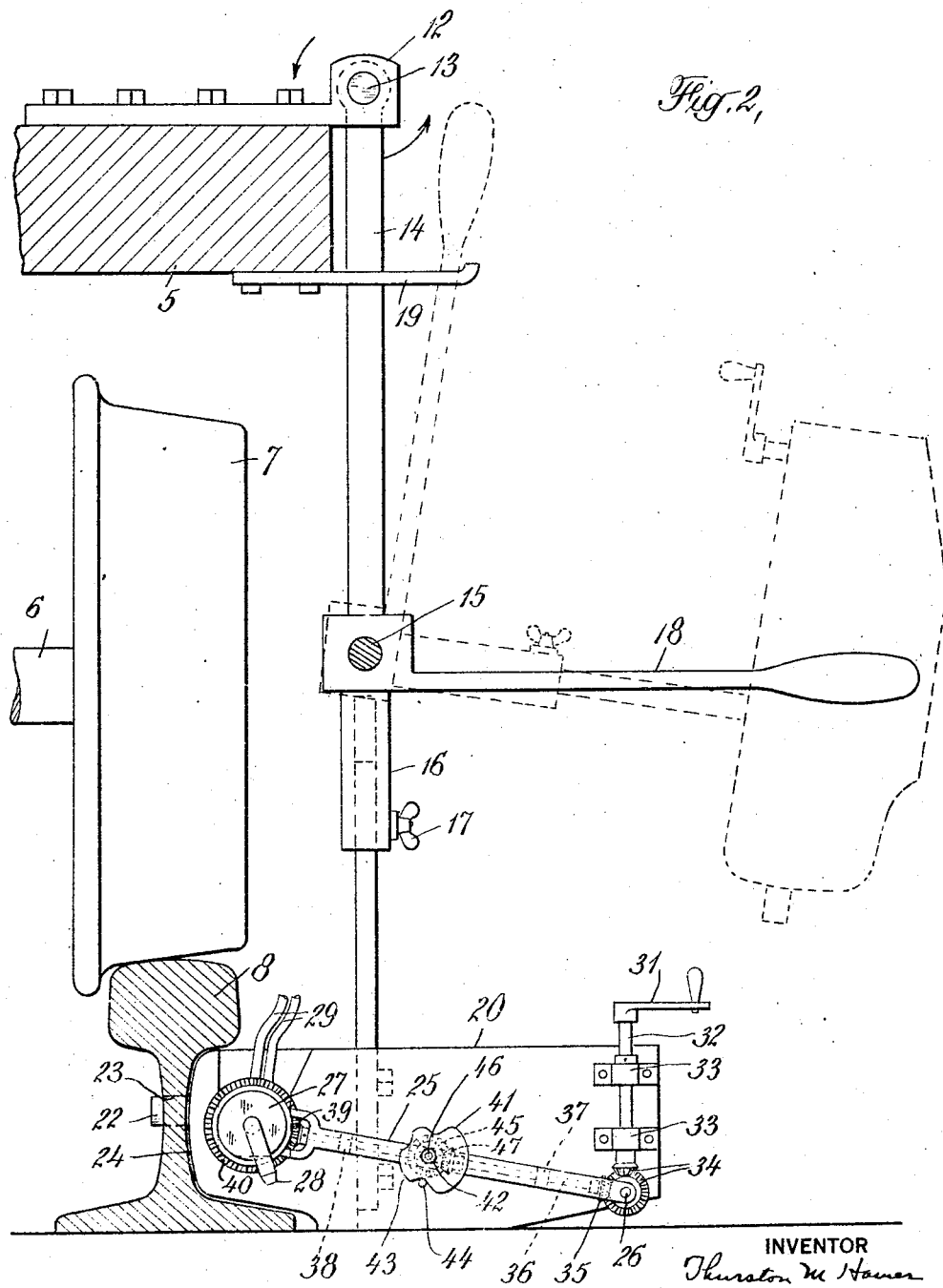

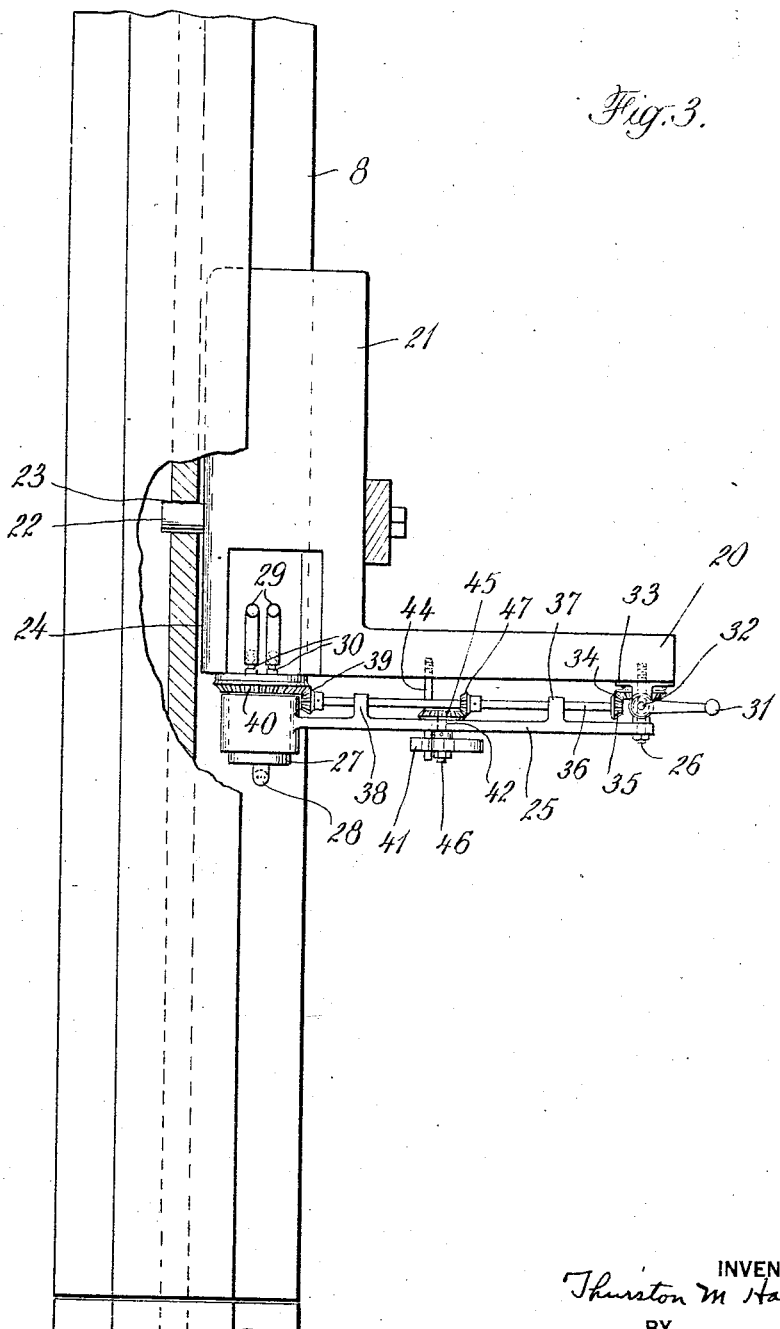

Patented July 14, 1925.

1,546,128

UNITED STATES PATENT OFFICE.

THURSTON M. HAMER, OF NEW YORK, N. Y., ASSIGNOR TO AIR REDUCTION COMPANY, INCORPORATED, OF NEW YORK, N. Y., A CORPORATION OF NEW YORK.

CUTTING APPARATUS.

Application filed March 20, 1925. Serial No. 17,149.

*To all whom it may concern:*

Be it known that I, THURSTON M. HAMER, a citizen of the Dominion of Canada, residing at New York city, in the county of New York, State of New York, have invented certain new and useful Improvements in Cutting Apparatus; and I do hereby declare the following to be a full, clear, and exact description of the invention, such as will enable others, skilled in the art to which it appertains, to make and use the same.

This invention relates to the maintenance of railroad rails in proper condition, and particularly to an improved method of and apparatus for cutting the worn ends of rails by means of oxygen while such rails are in place.

Railroad rails become badly worn at the joints and must be replaced or repaired at intervals to ensure proper maintenance of the road bed. It has been the practice heretofore to remove worn rails, transport them to a mill, saw the worn ends therefrom and return the rails to their former or to other places. This entails the removal of spikes, bolts and splice bars, the introduction of a new rail and the transportation of the worn rail to and from the place where the ends are cut. These various operations are, of course, relatively expensive.

It is the object of the present invention to permit the cutting of worn ends from rails in situ and to thereby reduce materially the expense involved in maintaining the rails in proper condition.

Other objects and advantages of the invention will be apparent as it is better understood by reference to the following specification and accompanying drawing, in which Fig. 1 is a side elevation of a car bearing the necessary equipment to permit the cutting of rails by means of an oxygen jet;

Fig. 2 is a detail in elevation of the cutting means and the operating mechanism therefor; and Fig. 3 is a plan view of the structure illustrated in Fig. 2.

In carrying out the invention the necessary apparatus is mounted upon a hand car of the usual type so that it can be moved readily from place to place during the operation. The car is used conveniently to carry tanks of oxygen and acetylene or other combustible gas and the necessary tools and equipment for the operation, including a hand-cutting torch which is used preferably to start the cuts in the rails. The car also carries one or more cutting torches arranged to be moved to and from cutting position and adapted to be operated by suitable mechanism so that the torch is moved uniformly about the contour of the rail. The mounting and mechanical operation of the torch or torches insure the production of a clean cut squarely across the ends of the rails so that the adjacent ends can be drawn together in abutting relation and again secured by the application of splice bars and bolts. The mechanism includes a gauge or gauges whereby the position of the cut with respect to the bolt holes is determined accurately, it being intended that the new bolt holes shall be cut in the rails at the proper position determined upon inspection thereof before the ends of the rails are cut therefrom. When the ends have been cut the rails are drawn together and secured and new rails are inserted at intervals to fill in the space left by parts of the rails which are severed therefrom.

Referring to the drawing, 5 indicates the body of the car which is suitably mounted upon axles 6 bearing wheels 7 of the usual type and adapted to cooperate with the rails 8. At the joint 9 the rails are held together by splice bars 10 and bolts 11.

Plates 12 are secured to the body 5 of the car and provide pivots 13 for depending arms 14, the latter forming a support for a longitudinal bar 15. Pivoted on the bar 15 are supporting arms 16 to which the cutting mechanism is secured preferably by set screws 17 which permit relative adjustment of the parts. Handles 18 are secured to the arms 16 so that the cutting mechanism can be lifted and moved to inoperative position when the car is to be moved. The handles 18 are adapted to engage latches 19 which hold them resiliently in inoperative position. When released the cutting mechanism falls naturally into operative position.

The cutting mechanism comprises a guide plate 20 having an extension 21 and a lug 22 which is adapted to fit closely in a bolt hole 23 which has been provided in the rail at the proper distance from the end thereof. The lug 22 forms a gauge whereby the position of the cut is determined. The lower edge of the plate 20 rests upon the ground adjacent to the rail and the end 24 thereof is preferably shaped to conform to the rail so that the cutting mechanism will be held firmly in the desired position.

An arm 25 is pivotally mounted at 26 on the plate 20 and carries on its outer end a rotatable torch 27, a tip 28 which is of the usual form having passages therein for mixed gases which are adapted to burn and to thus heat the rail to the desired temperature, and a passage for oxygen which is supplied at considerable pressure and performs the cutting operation. The exact arrangement of the interior passages in the tip is not a part of the present invention since its arrangement is well understood in the art. The gases used are supplied through flexible hose 29 secured to nipples 30 and to sources of supply of oxygen and a combustible gas such as acetylene. These gases are conveniently carried in tanks under pressure which may be mounted on the car, the tanks being provided with the usual regulating devices to ensure delivery of the gases at the desired pressure. Conveniently the valves for controlling the supply of oxygen and combustible gas can be disposed on the body 5 of the car where they can be reached readily by the operator.

It is necessary to move the cutting torch during the cutting operation and to cause it to follow substantially the outline of the rail. This is accomplished by the provision of an operating handle 31 which is secured to a shaft 32, the latter being mounted in suitable bearings 33 on the plate 20. A bevel gear 34 on the shaft 32 meshes with a similar pinion 35 and shaft 36, the latter being mounted in bearings 37 and 38 on the arm 25. A bevel pinion 39 on the shaft 36 meshes with a similar gear 40 on the torch 27. The latter being pivoted on the arm 25 is adapted to be rotated by the rotation of the handle 31.

Rotation of the torch would not be sufficient as it would not thereby follow the contour of the rail. Consequently a cam 41 is pivoted at 42 on the arm 25 and is provided with a face 43 of suitable form to contact with a lug 44 on the plate 20. A bevel gear 45 is secured to a pivoted shaft 46 on which the cam 41 is mounted and meshes with a pinion 47 on the shaft 36. Consequently, as the handle 31 is turned the torch 27 is rotated and the arm 25 is swung at the same time on its pivot 26. When, therefore, the torch is set in proper position to direct the heating and oxygen jets on the foot of the rail in starting the cutting operation and when the handle 31 is operated, the torch tip may be moved so that it follows substantially the outline of the rail and directs the cutting jet thereon in such a manner as to sever the end of the rail therefrom.

In conducting the operation it is desirable to start the cut on the inner side of the rail foot with a hand-cutting torch such as is commonly used in cutting metal with the oxygen jet. This cut marks the portion of the rail which is to be removed. The new bolt holes are then drilled in the rail at the proper distance from the cut, a suitable gauge being used to determine the position of the bolt holes. When the bolt holes have been drilled the hand car is moved into proper position and the cutting mechanism is dropped so that the lugs 22 can enter the new bolt holes and thus position the mechanical cutting apparatus so as to register with the cuts in the rail foot. Having thus positioned the apparatus the operator or operators adjust the torch or torches 27, ignite the combustible gas of the heating jets and when the initial heating is accomplished turn on the oxygen jet or jets and manipulate the handles 31. As the cut proceeds through the rail end each torch is moved in an arc which corresponds substantially with the shape of the rail and the rail end is quickly and easily severed from the body thereof. Rails differ in size and shape, and it is necessary, therefore, to provide cams of different shapes to meet the conditions. By the substitution of a suitable cam the torch can be made to follow any of the standard rail shapes.

As soon as the ends have been severed the rail ahead in the direction in which the party is working can be loosened by removing the spikes on one side thereof. The rails can be drawn backwardly then until the ends of the two rails abut. The rails are then spiked in the new position and splice bars and bolts are inserted. In cropping off the ends of rails in this way a considerable space will be left eventually which must be filled by the insertion of a new rail having a length equivalent to the length of the ends which have been removed.

The details of the apparatus as herein described are illustrative of those features which are essential and best adapted to accomplish the purpose of the invention.

Various changes may be made in the form and arrangement of the parts without departing from the invention or sacrificing any of the advantages thereof.

I claim:

1. The method of improving railroad road-beds, which comprises cutting the worn ends from the rails in situ, drawing the ends of the rails together and securing the rails with the new ends in abutting relation.

2. The method of improving railroad road-beds, which comprises drilling holes in the rails at points spaced from the worn ends thereof, cutting the worn ends from the rails in situ at gauged distances from the drilled holes, drawing the rails together and securing the rails with the new ends in abutting relation.

3. The method of improving railroad road-beds, which comprises cutting the worn ends from the rails in situ with an oxygen jet, drawing the ends of the rails together and securing the rails with the new ends in abutting relation.

4. The method of improving railroad road-beds, which comprises cutting the foot of each rail at selected points spaced from the worn ends thereof, drilling the rails at gauged distances from the cuts, cutting the worn ends from the rails in situ at the points marked by the preliminary cuts, drawing the rails together and securing the rails with new ends in abutting relation.

5. The method of improving railroad road-beds, which comprises cutting the foot of each rail at selected points spaced from the worn ends thereof, drilling the rails at gauged distances from the cuts, cutting the worn ends from the rails in situ with an oxygen jet at the points marked by the preliminary cuts, drawing the rails together and securing the rails with new ends in abutting relation.

6. In an apparatus for cutting railroad rails, the combination of a guide plate carrying a cutting torch and having a lug thereon to engage a bolt hole in the rail and hold the torch in spaced relation to the bolt hole, and means for causing the torch to move in a direction following substantially the contour of the rail.

7. In an apparatus for cutting railroad rails, the combination of a guide plate carrying a cutting torch and having a lug thereon to engage a bolt hole in the rail and hold the torch in spaced relation to the bolt hole, means for causing the torch to move in a direction following substantially the contour of the rail, including means for rotating the torch and means for swinging the torch as it rotates.

8. In an apparatus for cutting railroad rails, the combination of a guide plate carrying a cutting torch and having a lug thereon to engage a bolt hole in the rail and hold the torch in spaced relation to the bolt hole, means for causing the torch to move in a direction following substantially the contour of the rail, including an arm, on which the torch is rotatably mounted, pivoted on the guide plate and means for simultaneously rotating the torch, and moving the arm on its pivot.

9. In an apparatus for cutting railroad rails, the combination of a guide plate carrying a cutting torch and having a lug thereon to engage a bolt hole in the rail and hold the torch in spaced relation to the bolt hole, means for causing the torch to move in a direction following substantially the contour of the rail, including an arm, on which the torch is rotatably mounted, pivoted on the guide plate, a cam supported on the arm and adapted to engage the guide plate and means for simultaneously rotating the torch and cam whereby the arm is swung on its pivot as the torch rotates.

10. In an apparatus for cutting railroad rails, the combination of a guide plate carrying a cutting torch and having a lug thereon to engage a bolt hole in the rail and hold the torch in spaced relation to the bolt hole, means for causing the torch to move in a direction following substantially the contour of the rail, including an arm, on which the torch is rotatably mounted, pivoted on the guide plate, a cam supported on the arm and adapted to engage the guide plate, a shaft, connections between the shaft and the torch and cam and means for rotating the shaft.

11. In an apparatus for cutting railroad rails, the combination of a wheeled support, and gas-cutting means thereon adapted to be swung into and out of operative position adjacent to the rail.

12. In an apparatus for cutting railroad rails, the combination of a wheeled support, gas-cutting means thereon adapted to be swung into and out of operative position adjacent to the rail and means for holding the gas-cutting means in inoperative position while the wheel support is moved.

13. In an apparatus for cutting railroad rails, the combination of a wheeled support, gas-cutting means thereon adapted to be swung into and out of operative position adjacent to the rail, the gas-cutting means including a torch and means for causing the torch to move in a direction following substantially the contour of the rail.

14. In an apparatus for cutting railroad rails, the combination of a wheeled support, and gas-cutting means thereon adapted to be swung into and out of operative position adjacent to the rail, including means to gauge the position of the cut with reference to a bolt hole in the rail.

15. In an apparatus for cutting railroad rails, the combination of a wheeled support, gas-cutting means thereon adapted to be swung into and out of operative position adjacent to the rail, the gas-cutting means including a torch and means for simultaneously rotating and bodily moving the torch to cause it to follow substantially the contour of the rail.

In testimony whereof I affix my signature.

THURSTON M. HAMER.